US012695077B2

(12) United States Patent
Dziekonski

(10) Patent No.: US 12,695,077 B2
(45) Date of Patent: Jul. 28, 2026

(54) NESTED ELECTROSTATIC LINEAR ION TRAPS AND METHODS OF OPERATING THE SAME

(71) Applicant: DH Technologies Development Pte. Ltd., Singapore (SG)

(72) Inventor: Eric Thomas Dziekonski, Concord (CA)

(73) Assignee: DH Technologies Development Pte. Ltd., Singapore (SG)

( * ) Notice: Subject to any disclaimer, the term of this patent is extended or adjusted under 35 U.S.C. 154(b) by 347 days.

(21) Appl. No.: 18/278,680

(22) PCT Filed: Feb. 24, 2022

(86) PCT No.: PCT/IB2022/051644
§ 371 (c)(1),
(2) Date: Aug. 24, 2023

(87) PCT Pub. No.: WO2022/180570
PCT Pub. Date: Sep. 1, 2022

(65) Prior Publication Data
US 2024/0194472 A1 Jun. 13, 2024

Related U.S. Application Data

(60) Provisional application No. 63/154,445, filed on Feb. 26, 2021.

(51) Int. Cl.
*H01J 49/42* (2006.01)

(52) U.S. Cl.
CPC ...... *H01J 49/4245* (2013.01); *H01J 49/4295* (2013.01)

(58) Field of Classification Search
CPC ............... H01J 49/4245; H01J 49/4295; H01J 49/4255; H01J 49/426
See application file for complete search history.

(56) References Cited

U.S. PATENT DOCUMENTS 6,888,130 B1 * 5/2005 Gonin ................ H01J 49/0095 250/281

FOREIGN PATENT DOCUMENTS

| | | | | |
|---|---|---|---|---|
| WO | WO-2019236142 A1 * | 12/2019 | .......... | H01J 49/4245 |
| WO | 2020117292 A1 | 6/2020 | | |
| WO | WO-2020121166 A1 * | 6/2020 | .......... | H01J 49/4245 |

OTHER PUBLICATIONS

Corrected International Search Report and Written Opinion, PCT/IB2022/051644, Dated Oct. 12, 2022, pp. 17.
International Search Report and Written Opinion, PCT/IB2022/051644, Dated Jun. 9, 2022, pp. 19.

* cited by examiner

*Primary Examiner* — David E Smith
(74) *Attorney, Agent, or Firm* — Potomac Law Group, PLLC; Reza Mollaaghababa; Brian Hairston

(57) ABSTRACT

Methods and systems for operating an ELIT are provided herein. In accordance with various aspects of the present teachings, and ELIT is provided that can enable simultaneous trapping of two different groups of ions as each group oscillates along a different path length within the ELIT.

20 Claims, 7 Drawing Sheets

NESTED ELECTROSTATIC LINEAR ION TRAPS AND METHODS OF OPERATING THE SAME

RELATED APPLICATIONS

This application is a 35 U.S.C. 371 national stage filing of International Application No. PCT/IB2022/051644, filed on Feb. 24, 2022, which claims priority to U.S. Provisional Application No. 63/154,445 filed on Feb. 26, 2021, and is entitled "Nested Electrostatic Linear Ion Traps and Methods of Operating the Same", the content of which is incorporated herein by reference in its entirety.

FIELD

The present teachings generally relate to methods and systems for analyzing ions using an electrostatic linear ion trap (ELIT).

BACKGROUND

An electrostatic linear ion trap (ELIT) is a mass analyzer in which ions are confined along an axis between electrode ion mirrors (reflectrons), typically on opposite sides of a central pickup electrode. The average kinetic energy (average velocity) of ions in the ELIT is fixed by the injection method, electrode geometries, and trapping potentials. As a result, ions in the ELIT oscillate back and forth along the axis from end to end with a mass-to-charge ratio (m/z) specific average velocity. Ion oscillation between the reflectrons generates an electric current, the frequency of which can be used to calculate the m/z of the trapped ions as follows:

$$f_{ion} = \frac{k}{\sqrt{m/z}} + b$$

where k and b are experimentally determined constants. In this manner, the charge induced on the pickup electrode may be digitized and subject to Fourier transform (FT) to calculate the mass spectrum. An example of a known ELIT is described, for example, by Dziekonski et al. in a paper entitled "Voltage-induced frequency drift correction in Fourier transform electrostatic linear ion trap mass spectrometry using mirror-switching" as published in the International Journal of Mass Spectrometry 410:12-21 (2016), the teachings of which are hereby incorporated by reference in their entirety.

PCT Pub. No. WO2020/121166, which is also incorporated by reference in its entirety, describes another example ELIT that can be alternatively operated to analyze either a wide m/z range with low resolution or a narrower m/z range with higher resolution. Wherein the axial length of an ELIT is inversely related to FT resolution for a fixed acquisition time and ion kinetic energy (e.g., a longer oscillation path length results in a lower oscillation frequency), PCT Pub. No. WO2020/121166 provides a system that can adjust the oscillation path length through the selective application of voltages to the various electrodes of the ELIT, thereby allowing for selection of the m/z range and/or resolution for each ion ELIT analysis of an ion injection. Such a system allows a user to select parameters of the ELIT analysis for all ions injected into the trap without, for example, requiring two or more ELITs having different analysis parameters running in parallel (e.g., requiring duplication of parts) or without breaking vacuum to physically replace the ELIT with a different ELIT having a different configuration of reflectrons (e.g., requiring downtime and skilled labor).

However, there remains a need for improved methods and systems for analyzing ions using an electrostatic linear ion trap (ELIT).

SUMMARY

Because voltages should be stable throughout the ELIT analysis window to achieve high mass resolution/accuracy, power supplies in conventional ELITs often have filtering networks exhibiting very long time constants (milliseconds to seconds to minutes). Accordingly, in conventional systems, not only must one wait for an ELIT analysis to be completed before adjusting potentials applied to the reflectrons, but the trap also remains unusable until these potentials are ramped to their final, adjusted values and the ELIT achieves the required stabilization criterion, potentially decreasing the duty cycle of the ELIT when changes to the ion oscillation path length are required. In accordance with certain aspects of the present teachings, systems and methods are provided that can enable simultaneous trapping of two different groups of ions as each group oscillates along a different path length within the ELIT, thereby improving duty cycle.

In accordance with various aspects of the present teachings, an ELIT is provided comprising first and second sets of electrode plates having holes in the center and aligned along a central axis. In some aspects, a detector may be disposed between the first and second sets of electrode plates. The ELIT may also comprise one or more voltage sources and a controller operably coupled thereto that is configured to apply voltages to a first group of plates of the first and second sets of electrodes to cause the first group of plates to trap a first group of ions within a first path length along the central axis, and simultaneously, apply voltages to a second group of plates of the first and second sets to cause the second group of plates to trap a second group of ions within a second path length along the central axis, wherein the second path length is longer than the first path length.

In various aspects, the controller may be further configured to cause the second group of plates to trap the second group of ions within the second path length while the first group of ions are trapped within the first path length. In some related aspects, the controller may be configured to control the injection of the first and second groups of ions into the first and second sets of electrode plates. By way of example, the controller may be operably coupled to an upstream ion trap from which the first and second groups of ions are injected into the into the first and second sets of electrode plates.

In certain aspects, the system may comprise at least one detector for detecting the oscillation of the ions. For example, in some aspects, at least one detector may be disposed between the first set of electrode plates and the second set of electrode plates. In some related aspects, the at least one detector may be configured to measure the electric current induced by the first group of ions oscillating along the first path length and the electric current induced by the second group of ions oscillating along the second path length. In some aspects, the system may comprise a first detector configured to measure the electric current induced by the first group of ions oscillating along the first path length and a second detector configured to measure the electric current induced by the second group of ions oscillating along the second path length.

In accordance with various aspects of the present teachings, the first and second groups of ions may differ in at least one of polarity and injection energy.

In certain example aspects, the first group of plates and the second group of plates do not share any plates.

In various aspects, each of the first group of plates and the second group of plates can include at least one trapping plate, at least one plate to change the curvature of the electric field near a turning point, and at least one plate to radially confine ions. Additionally or alternatively, in some aspects, the first group of plates includes at least four plates from the first set and at least four plates from second set and wherein the second group of plates includes at least four plates from the first set and at least four plates from second set.

In some example aspects, the system can also comprise one or more switches, wherein the controller is further operably connected to the one or more switches so as to select the first path length by applying voltages from the one or more voltage sources to the first set and the second set that cause the first group of plates to trap a third group of ions within the first path length; and select the second path length by applying voltages from the one or more voltage sources to the first set and the second set that cause the second group of plates to trap the third group of ions within the second path length.

Various groups of nested electrodes may be provided in accordance with the present teachings. For example, in some aspects, the system can comprise a third group of plates of the first set and the second set positioned along the central axis to trap ions within a third path length of the central axis that is longer than the second path length.

In accordance with various aspects of the present teachings, a method of operating an electrostatic ion trap (ELIT) is provided, the method comprising: applying voltages from one or more voltage sources to a first group of plates of a first set of electrode plates and a second set of electrode plates, wherein each electrode plate of the first and second sets of electrode plates have a hole in the center aligned along a central axis, wherein the application of voltages causes a first group of ions to be trapped within a first path length along the central axis defined by the first group of plates; and simultaneously applying voltages from the one or more voltage sources to a second group of plates of the first and second sets of electrode plates to cause the second group of plates to be configured to trap a second group of ions within a second path length along the central axis, wherein the second path length is longer than the first path length.

In some example aspects, at least one detector can be disposed between the first and second sets of electrode plates, the method further comprising measuring with at least one detector the electric current induced by the first group of ions oscillating along the first path length and the electric current induced by the second group of ions oscillating along the second path length. In some alternative aspects, a first detector can measure the electric current induced by the first group of ions oscillating along the first path length; and a second detector the electric current induced by the second group of ions oscillating along the second path length. In some related aspects, the first detector can simultaneously measure the electric current induced by the first group of ions oscillating along the second path length, for example, due to the overlap of the oscillating groups of ions.

In various aspects, methods in accordance with the present teachings may further comprise trapping the second group of ions within the second path length while the first group of ions are trapped within the first path length. In related aspects, the frequency of oscillation of the first group of ions can be detected after trapping the second group of ions within the second path length. In some such aspects, the oscillation of the first and second groups of ions can be performed simultaneously. Alternatively, the frequency of oscillation of the first group of ions can be detected prior to trapping the second group of ions within the second path length.

In accordance with various aspects of the present teachings, a computer program product is provided, the computer program product comprising a non-transitory and tangible computer-readable storage medium whose contents include a program with instructions being executed on a processor to perform the methods described herein.

These and other features of the applicant's teachings are set forth herein.

BRIEF DESCRIPTION OF THE DRAWINGS

The skilled person in the art will understand that the drawings, described below, are for illustration purposes only. The drawings are not intended to limit the scope of the applicant's teachings in any way.

DETAILED DESCRIPTION

Figure 1:
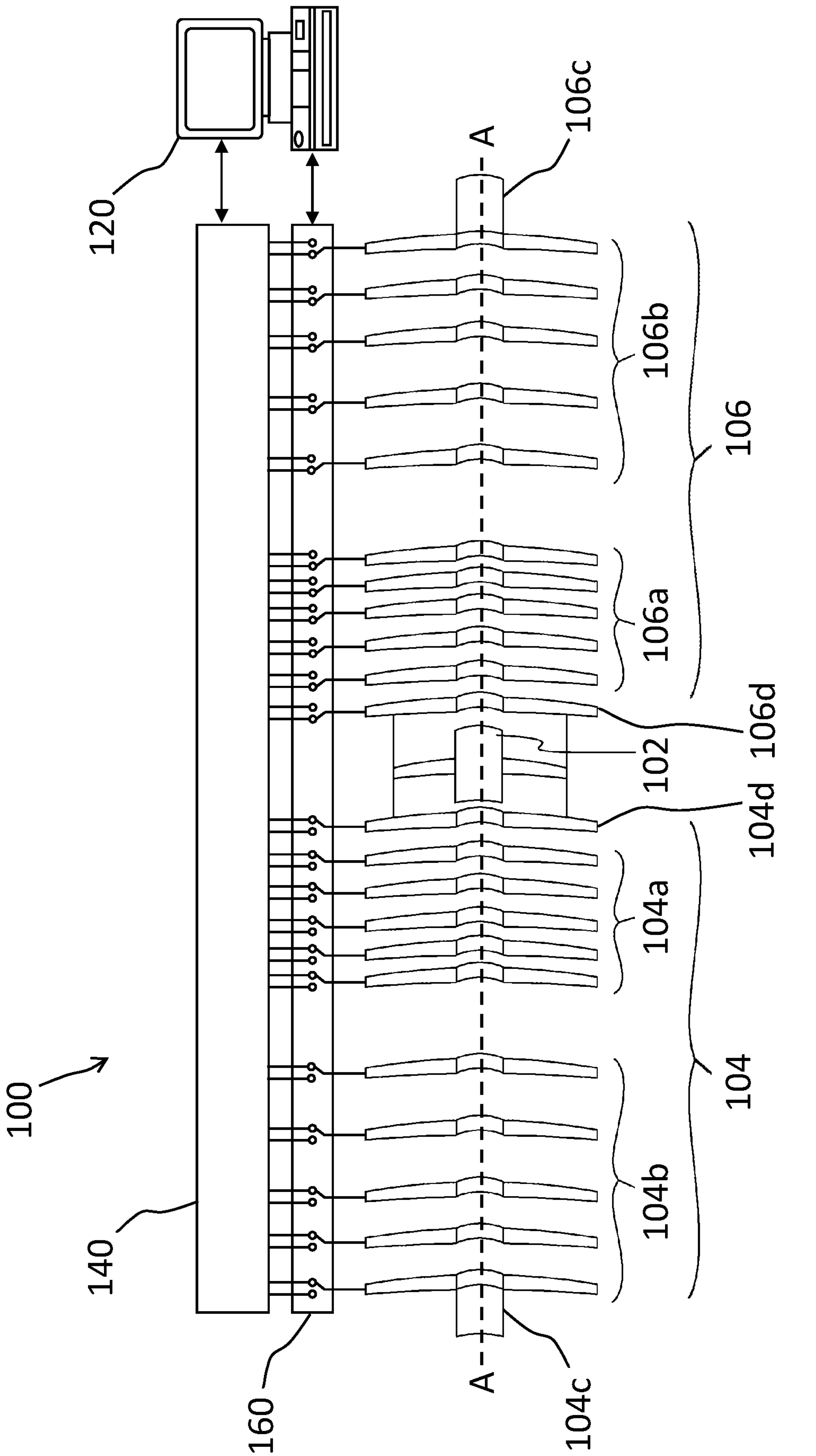
FIG. 1 is a schematic representation of an exemplary ELIT in accordance with an aspect of various embodiments of the applicant's teachings.

It will be appreciated that for clarity, the following discussion will explicate various aspects of embodiments of the applicant's teachings, while omitting certain specific details wherever convenient or appropriate to do so. For example, discussion of like or analogous features in alternative embodiments may be somewhat abbreviated. Well-known ideas or concepts may also not be discussed in any great detail for brevity. The skilled person will recognize that some embodiments of the applicant's teachings may not require certain of the specifically described details in every implementation, which are set forth herein only to provide a thorough understanding of the embodiments. Similarly, it will be apparent that the described embodiments may be susceptible to alteration or variation according to common general knowledge without departing from the scope of the disclosure. The following detailed description of embodiments is not to be regarded as limiting the scope of the applicant's teachings in any manner.

As used herein, the terms "about" and "substantially equal" refer to variations in a numerical quantity that can occur, for example, through measuring or handling procedures in the real world; through inadvertent error in these procedures; through differences in the manufacture, source, or purity of compositions or reagents; and the like. Typically, the terms "about" and "substantially" as used herein means 10% greater or lesser than the value or range of values stated or the complete condition or state. For instance, a concentration value of about 30% or substantially equal to 30% can mean a concentration between 27% and 33%. The terms also refer to variations that would be recognized by one skilled in the art as being equivalent so long as such variations do not encompass known values practiced by the prior art.

Systems and methods in accordance with various aspects of the present teachings provide for the simultaneous application of trapping potentials to different groups of electrodes within an ELIT. In certain aspects, the systems and methods may trap two different groups of ions (e.g., ion groups differing in their m/z range, injection energy, and/or polarity) along two different path lengths within an ELIT. In this manner, the downtime associated with stabilizing the ELIT after switching the various ELIT electrodes between an analysis of a wider m/z range with low resolution and an analysis of a narrower m/z range with higher resolution can be reduced, thereby improving duty cycle of the ELIT. For example, in certain aspects, a first group of ions may be injected into the ELIT and trapped between inner reflectrons defining a first path length. While this first group of ions oscillate along the first path length, the potentials applied to the outer reflectrons can be adjusted without effecting the first group's analysis. In such a manner, the potentials applied to the outer reflectrons can be stabilized, for example, after the injection of the first group of ions and/or during their analysis. In some aspects, the present teachings additionally provide for the injection of a second group of ions exhibiting different characteristics relative to the first group of ions such that the second group may be trapped between the outer reflectrons defining a second, longer path length while the first group of ions is trapped and/or being analyzed. In various aspects, the inner reflectrons can be grounded following the detection of the frequency of oscillation of the first group of ions, and the charge generated by the oscillation frequency of the second group of ions can then be detected. In this manner, a user need not wait to inject the second group of ions into the ELIT until after the analysis of the first group of ions as in conventional systems, and moreover, need not further wait for the ELIT to stabilize after the analysis of the first group of ions as the inner reflectrons can achieve ground potential nearly instantaneously.

FIG. 1 schematically depicts an embodiment of an exemplary ELIT 100 comprising a plurality of aligned electrode plates and a detector 102 (e.g., a pickup electrode) for mass analyzing ions in accordance with various aspects of the applicant's teachings. The exemplary ELIT 100 additionally comprises a controller 120, operably coupled to one or more voltage sources 140 and one or more switches 160, for controlling the potentials applied to the plurality of electrode plates during operation of the ELIT as discussed otherwise herein.

As shown in FIG. 1, each of the example electrode plates comprise a central opening through which a central axis (A) extends. Though the electrode plates of FIG. 1 are shown as generally planar and together represent a cylindrical structure, a skilled artisan would appreciate that the shape, size, and number of individual electrodes (and overall shape of the trap) can have a variety of configuration for controlling movement of the ions when performing ELIT in accordance with the present teachings. See e.g., Hogan, J. A. et al., "Optimized Electrostatic Linear Ion Trap for Charge Detection Mass Spectrometry," J. Am. Soc. Mass Spectrom., 29:2086-2095 (2018), the teachings of which are hereby incorporated by reference in their entirety.

Generally, the plurality of the electrode plates are separated into two sets such that the ions can oscillate along the central axis between electrodes from each set. For example, as shown in FIG. 1, a first set 104 of electrode plates is disposed on one side of the detector 102 (e.g., the left side) and the second set 106 of electrode plates is disposed on the opposed side of the detector 102 (e.g., the right side). The detector 102 can have a variety of configuration but is generally used to measure the induced image current or image charge produced by the oscillating ions as discussed otherwise herein. It will be appreciated that while the detector 102 shown in FIG. 1 is generally described herein as a central pickup electrode, the detector 102 need not be disposed between the first and second sets 104, 106. Indeed, a person skilled in the art will appreciate that detection of the ion oscillation can be performed by the electrode plates themselves, using multiple electrodes, or other shaped electrodes. In certain example aspects, at least two detectors may be provided, with the at least two detectors being represented by the depicted central pickup electrode 102, one or more plates of the first set, one or more plates of the second set, and combinations thereof. A Fourier transform (FT) may then be performed on the digitized signal measured by the detector 102 to obtain the oscillation frequency or frequencies, which as noted above is/are dependent on the m/z of the one or more oscillating ions such that the m/z of the oscillating ions can be calculated.

In accordance with various aspects of the present teachings, the electrode plates of the first and second sets 104,106 can be configured through the application of various electric potentials to generally operate as a nested electrostatic ion trap. That is, a first group of electrodes of the first and second set may operate as a first, inner trap defining a first path length for ion oscillation and a second group of electrodes surrounding the electrodes of the inner trap may operate as a second, outer trap defining a second longer path length for coaxial ion oscillation. As shown in FIG. 1, for example, the first set 104 of electrode plates generally comprises plates **104*a* of a first group 104*a*/106*a* and plates 104*b* of a second group 104*b*/106*b*. Likewise, the second set 106 of electrode plates generally comprises plates 106*a* of the first group 104*a*/106*a* and plates of 106*b* of the second group 104*b*/106*b*. Together, the first group 104*a*/106*a* represents the inner electrodes in that they are disposed toward the center of the trap (i.e., toward detector 102) relative to the second group 104*b*/106*b*. As shown, the end electrodes 104*c*, 106*c* of each set 104, 106 allow for the introduction and/or removal of ions from the ELIT 100 along the central axis (A). Additionally, one or more of the inner electrodes 104*d*, 106*d* (e.g., adjacent detector 102) can be biased to act as an einzel lens, thereby radially focusing the oscillating ion beam, for example, through the detector tube 102**.

Figure 2:
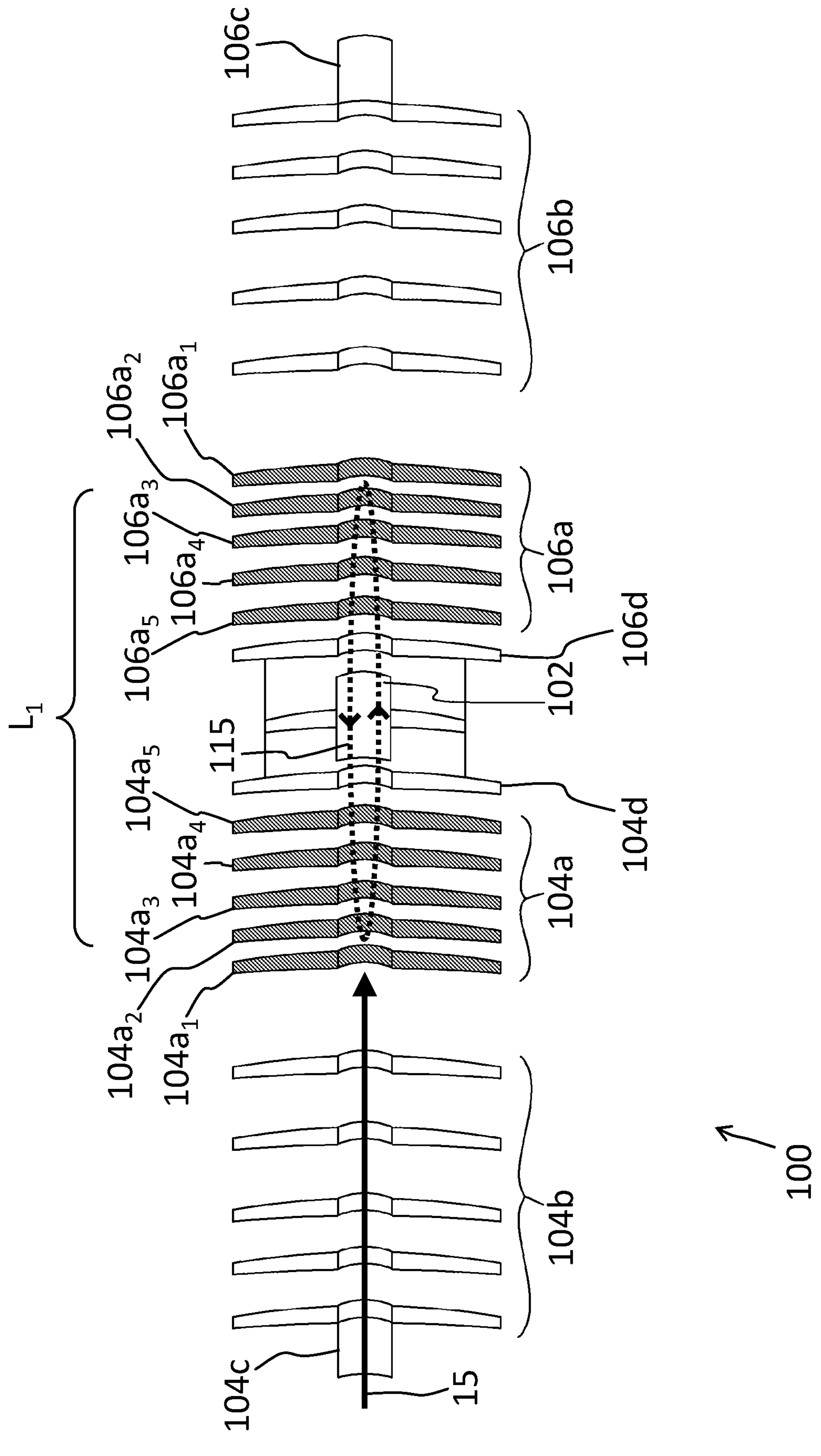
FIG. 2 is a schematic representation of the ELIT of FIG. 1 in which the inner group of electrodes are activated to trap ions in accordance with an aspect of various embodiments of the applicant's teachings.

With reference now to FIG. 2, the ELIT 100 of FIG. 1 is depicted in a first configuration in accordance with various aspects of the present teachings in which the controller 120 controls the one or more voltage sources 140 and/or one or switches 160 to apply potentials to the electrodes of the first and second set 104, 106 such that injected ions 15 are trapped by the electrodes 104*a* and the electrodes 106*a* of the inner, first group 104*a*/106*a* (the controller 120, voltage source(s) 140, and switch(es) 160 are not shown in FIG. 2 for clarity). As will be appreciated skilled in the art, the electrostatic potential applied to each electrode plate of the first group 104*a*/106*a* can be controlled so as to provide for trapping of the ions 15 therein. As shown schematically in FIG. 2, ions 15 are injected axially through end electrode 104*c* (also referred to herein as an ion inlet) and oscillate axially between the first set of electrodes 104 and the second set of electrodes 106 along path 115 having a path length $L_1$, for example. Detector 102 can be used to measure an induced image charge or current produced by the ions 15 oscillating along path 115. In various aspects, when the first group 104*a*/106*a* is being utilized to trap ions within the path length $L_1$, the controller 102 can cause voltages to be applied to the second group 104*b*/106*b* so that they do not participate in the analysis of ions. In various embodiments, one or more plates of the second group 104*b*/106*b* can be used to focus the ions 15, e.g., during their injection into, or ejection from, the ELIT 100.

The electrode plates of the first group 104*a*/106*a* can have a variety of configurations for trapping ions in the ELIT 100 in accordance with various aspects of the present teachings. Though the first group 104*a*/106*a* is depicted in FIG. 2 as comprising 10 electrode plates (e.g., group 104*a*/106*a* comprises plates 104$a_{1-5}$ and 106$a_{1-5}$), it will be appreciated that the group 104*a*/106*a* can comprise any number of plates effective to trap ions in accordance with the present teachings. In certain aspects, at least one trapping plate and a minimum of three plates are used for changing the curvature of the electric field near each turning point (e.g., where the direction of ion oscillation is reversed) and radially confining ions throughout their procession of the trap. As a result, the first group 104*a*/106*a* can include at least four plates from the first set 104 and at least four plates from second set 106. In various aspects, fewer electrodes may be used in each group if the electrodes are shaped, for example (i.e., they are not represented by a cylindrical structure as discussed above with respect to Hogan et al). However, as depicted in FIG. 2 by way of non-limiting example, the electrodes 104*a* of the first group 104*a*/106*a* comprise one or more trapping plates 104$a_1$ (e.g., substantially defining the left end point or turning point of the oscillation), one or more plates 104$a_{2-4}$ to change the curvature of the electric field near the turning point, and one or more plates 104$a_5$ to radially confine the ions 15. Likewise, the opposed electrodes 106*a* of the first group 104*a*/106*a* can comprise one or more trapping plates 106$a_1$ (e.g., substantially defining the right turning point), one or more plates 106$a_{2-4}$ to change the curvature of the electric field near the turning point, and one or more plates 106$a_5$ to radially confine the ions 15. It will be appreciated by the skilled artisan in light of the present teachings that the potentials applied to the electrodes 104*a* and each corresponding electrode 106*a* of the group 104*a*/106*a*, for example, can be controlled so at to provide one or more of trapping, changing the curvature of the electric field, and radially confining the ions 15 as they oscillate between the turning points. The potentials applied to the corresponding plates (e.g., 104$a_n$ and 106$a_n$) in the first group 104*a*/106*a* and/or the position of the corresponding plates in the first group 104*a*/106*a* relative to the center of this group can be the same or different. In some example embodiments, the corresponding plates (e.g., 104$a_n$ and 106$a_n$) of the first group 104*a*/106*a* can be positioned an identical distance from the detector 102 and/or can be controlled to have identical potentials applied thereto when trapping the ions 15 as shown in FIG. 2.

Figure 3:
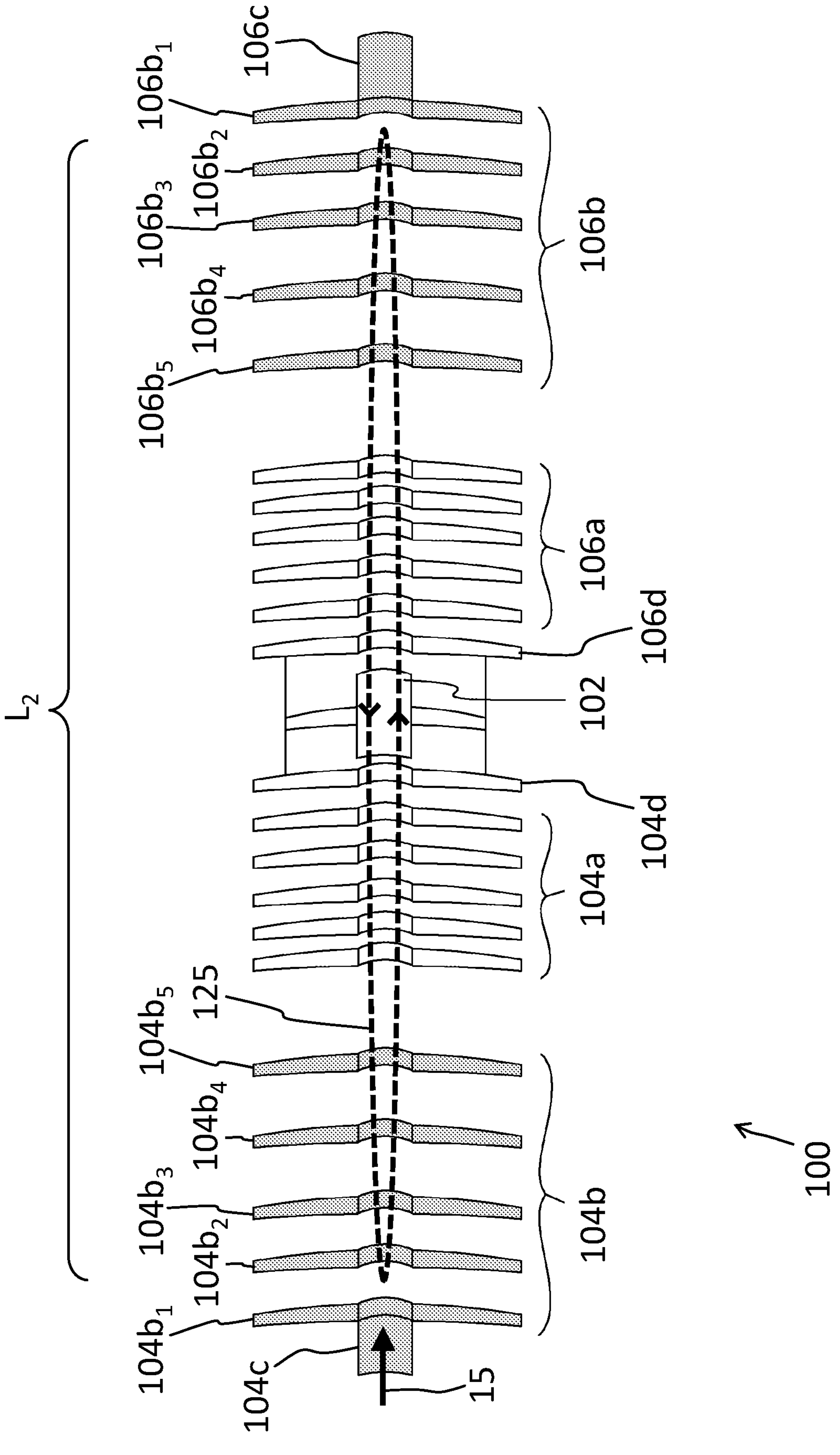
FIG. 3 is a schematic representation of the ELIT of FIG. 1 in which the outer group of electrodes are activated to trap ions in accordance with an aspect of various embodiments of the applicant's teachings.

With reference now to FIG. 3, the ELIT 100 of FIG. 1 is depicted in a second configuration in accordance with various aspects of the present teachings in which the controller 120 controls the one or more voltage sources 140 and/or one or switches 160 to apply potentials to the electrodes of the first and second set 104, 106 such that injected ions 15 are instead trapped by the electrodes 104*b*, 106*b* of the outer group 104*b*/106*b*. As above, it will be appreciated that the electrostatic potentials applied to each electrode plate 104*b*, 106*b* of the second group 104*b*/106*b* can be controlled so as to provide for trapping of the ions 15 along path 125 having a path length $L_2$, for example. Again, detector 102 can be used to measure an induced image charge or current produced by the ions 15 oscillating along path 125. In various aspects, when the second group 104*b*/106*b* is being utilized to trap ions within the path length $L_2$, the controller 102 can cause voltages to be applied to the first, inner group 104*a*/106*a* so that they do not interfere in the analysis of ions, for example, by radially focusing the ions 15.

The electrode plates of the group 104*b*/106*b* can also have a variety of configurations for trapping ions in the ELIT 100 in accordance with various aspects of the present teachings, and can comprise the same or different number of plates as the other group 104*a*/106*a*. As shown, however, the plates 104*b* of the group 104*b*/106*b* can comprise one or more trapping plates 104$b_1$ (e.g., substantially defining the left turning point), one or more plates 104$b_{2-4}$ to change the curvature of the electric field near the turning point, and one or more plates 104$b_5$ to radially confine the ions 15. Likewise, the plates 106*b* of the group 104*b*/106*b* can comprise one or more trapping plates 106$b_1$ (e.g., defining the right turning point), one or more plates 106$b_{2-4}$ to change the curvature of the electric field near the turning point, and one or more plates 106$b_5$ to radially confine the ions 15. Moreover, it will be appreciated that the potentials applied to each plate 104*b* and corresponding plate 106*b* (e.g., 104$b_n$ and 106$b_n$) of the group 104*b*/106*b* can be controlled so at to provide one or more of trapping, changing the curvature of the electric field, and radially confining the ions 15 as they oscillate between the turning points of the group 104*b*/106*b*. The potentials applied to the corresponding plates (e.g., 104$b_n$ and 106$b_n$) in the group 104*b*/106*b* and/or the position of the corresponding plates in the group 104*b*/106*b* relative to the center of this outer group can be the same or different. In some example embodiments, the corresponding plates (e.g., 104$b_n$ and 106$b_n$) of the group 104*b*/106*b* can be positioned an identical distance from the detector 102 and/or can be controlled to have identical potentials applied thereto when trapping the ions 15 as shown in FIG. 3.

Now comparing FIGS. 2 and 3, the configuration of the ELIT 100 in FIG. 3 provides a path length $L_2$ that is much longer than the path length $L_1$ of FIG. 2. In various aspects, the controller 120 can select (e.g., automatically or under the direction of a user) the path length $L_1$ or $L_2$ to be applied to the analysis of the ions 15. By way of example, the controller 120 can control the one or more voltage sources 120 and/or switches 140 to operate the ELIT 100 to trap the ions 15 by the plates of the first, inner group 104*a*/106*a*, such that ions 15 oscillate along the first path 115 having a path length $L_1$ (as in FIG. 2). Alternatively, the controller 120 can cause the ELIT 100 to operate such that the ions 15 are trapped by the plates of the second, outer group 104*b*/106*b* and oscillate along the second path 125 having a longer path length $L_2$. Due to the relative differences in path length between FIGS.

2 and 3, it will be appreciated that in some aspects the ELIT 100 can be operated such that all injected ions 25 are analyzed using either a relatively high resolution, narrow m/z range configuration (FIG. 2) or a relatively low resolution, broad m/z range configuration (FIG. 3). In various embodiments, switching between these modes may be performed between sample analyses. For example, the controller 120 could cause the one or more switches 160 (e.g., an electronic switch or an electromechanical switch) to adjust the potentials applied to the first and second sets 104, 106 to cause the ELIT 100 to change between the first path length $L_1$ of FIG. 2 and the second path length $L_2$ of FIG. 3.

It will be appreciated in light of the present teachings that the application of potentials to particular electrode plates of the ELIT 100 can further enable various groups of electrodes to be selected among sets 104, 106 to generate additional ion paths of various lengths, thus allowing a single ELIT to fit the needs of different analyses. By way of non-limiting example, the potentials applied to plates 104$b_5$ and 106$b_5$ of FIG. 3 could be adjusted such that these plates represent trapping plates serving as the endpoints of ion oscillation, while the potentials applied to plates 104$a_1$ and 106$a_1$ could be set so as to change the curvature of the electric field near the turning point. Moreover, it will be appreciated that the present teachings also provide that one or more additional nested groups of electrodes can be provided (e.g., adding another inner or outer group), thereby allowing for trapping of ions along one or more additional paths having longer or shorter path lengths than $L_1$ and/or $L_2$.

Figure 4:
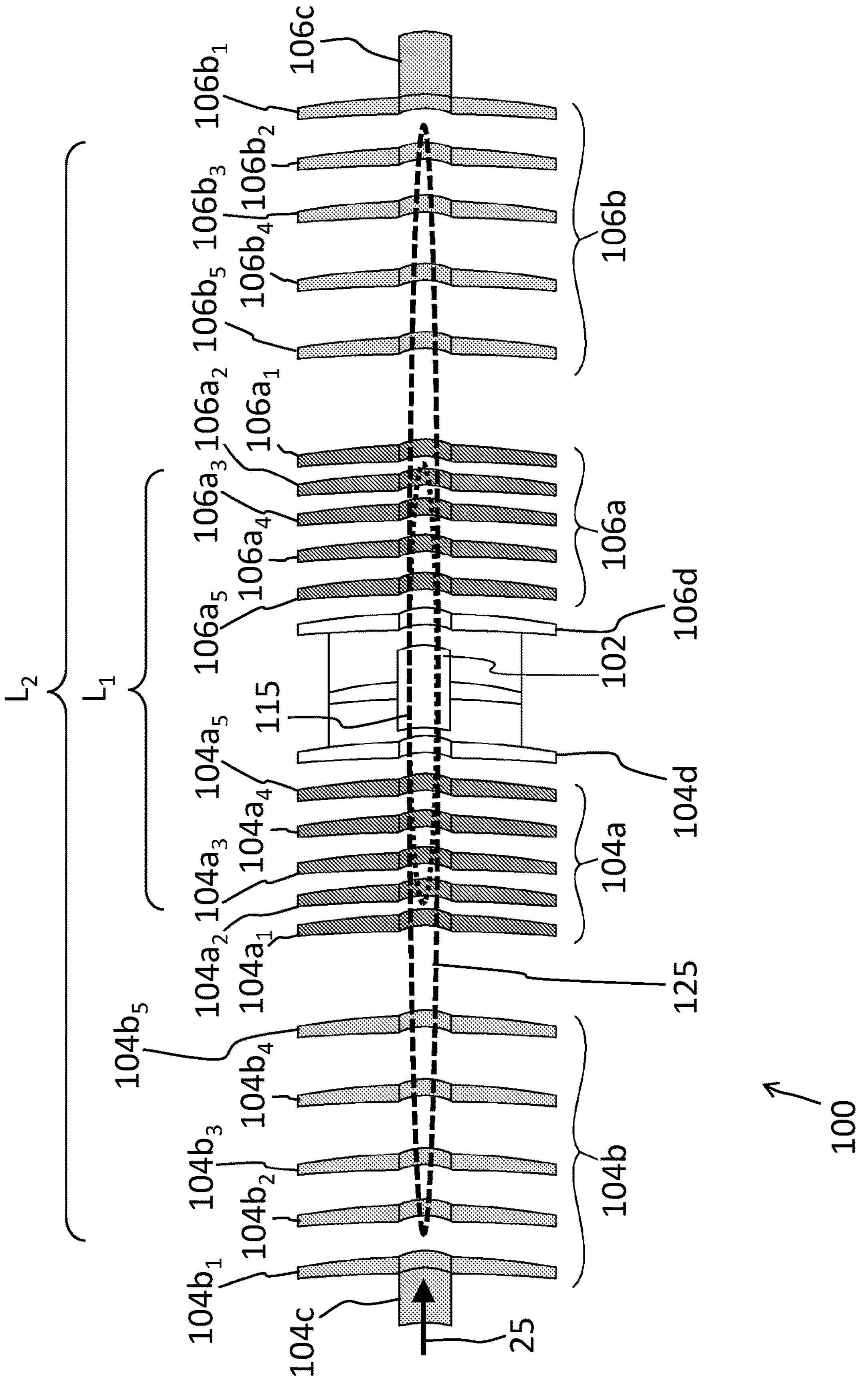
FIG. 4 is a schematic representation of the ELIT of FIG. 1 in which the inner and outer electrodes are activated to trap two groups of ions in accordance with an aspect of various embodiments of the applicant's teachings.

As discussed above, the controller 120 can cause the ELIT 100 to alternatively trap all of the injected ions 15 along either the first path 115 having a path length $L_1$ (as in FIG. 2) or along a second path 125 having a longer path length $L_2$ (as in FIG. 3), for example, by selecting the desired path length prior to ion injection. However, various aspects of the present teachings also provide for the simultaneous application of trapping potentials to both the first group 104$a$/106$a$ and the second group 104$b$/106$b$. For example, the ELIT 100 can first enable the trapping of a first group of ions 15 within the inner group 104$a$/106$a$ of the ELIT 100 as shown in FIG. 2. As discussed above, the ions 15 can be injected axially through end electrode 104$c$ and oscillate axially along path 115 having a path length $L_1$, during which the ions 15 can be analyzed by the detector 102. During this injection, for example, the controller 102 can cause voltages to be applied to the second group 104$b$/106$b$ to aid in radial focusing of the ions. However, rather than waiting for the analysis of ions 15 to be completed prior to adjusting the potentials applied to the first and second sets 104, 106 to adjust the path length for a subsequent analysis, the potentials applied to the second outer group 104$b$/106$b$ of electrodes can be adjusted and stabilized after the trapping of the first group of ions along the path 115. With reference now to FIG. 4, which depicts the first group of ions having already being trapped and oscillating along path length $L_1$ as in FIG. 2, the controller 102 causes the potentials applied to the second outer group 104$b$/106$b$ to be adjusted for trapping a second group of ions 25 along a second path 125 having a path length $L_2$. As discussed above, for example, the potentials applied to the plates of the second group 104$b$/106$b$ can be configured to cause plates 104$b_1$, 106$b_1$ to act as trapping plates (e.g., substantially defining the turning points of the path 125), the plates 104$b_{2\text{-}4}$, 106$b_{2\text{-}4}$ to be configured to change the curvature of the electric field near the turning points, and plates 104$b_5$, 106$b_5$ to provide radial confinement.

With the first group of ions 15 trapped along the path 115 between trapping plate 104$a_1$ and trapping plate 106$a_1$ of the first group 104$a$/106$a$, the potentials applied to the electrodes of the second group 104$b$/106$b$ can, in some aspects, be adjusted without substantially affecting the electric field generated along the first path length $L_1$ and/or without substantially affecting the oscillation of the first group of ions 15 along the first path 115. That is, the potentials applied to the electrodes of the outer, second group 104$b$/106$b$ can be provided without waiting first for the analysis of the first group of ions 15 to be completed. Moreover, these potentials can be ramped to their final values and the outer group 104$b$/106$b$ can achieve sufficient stabilization criterion during the oscillation of the first group of ions 15 within the inner group 104$a$/106$a$, thereby reducing or eliminating the delay caused by the power supply filters that are used to ensure voltage stability throughout an ELIT analysis window.

Not only may the outer group 104$b$/106$b$ be configured to trap ions along the second path 125 during the oscillation of the first group of ions 15 within the inner group 104$a$/106$a$ as discussed above, but certain aspects of the present teachings additionally provide for the injection and trapping of a second group of ions 25 while the first group of ions 15 is trapped within the inner group 104$a$/106$a$. That is, in certain aspects, a second group of ions 25 can be injected during the oscillation of the first group of ions 15 within the ELIT 100 (e.g., as shown in FIG. 2). As shown in FIG. 4, for example, the controller 120 may cause the plates of the second group 104$b$/106$b$ to generate a trapping electric field, and further allow the axial injection of a second group of ions 25 that can be trapped by the electrodes of the outer group 104$b$/106$b$ along path 125 having a path length $L_2$. As such, two different groups 15, 25 of ions may be simultaneously trapped within the ELIT 100 along two different path lengths $L_1$, $L_2$. It will be appreciated, for example, that the controller 102 can be operably coupled to an ion trap (not shown) or other ion control element known in the art or hereafter developed for transmitting ions into the ion inlet (104$c$), the controller configured to control the timing of ion injection, for example. Following injection of this second group 25, the two different groups 15, 25 may oscillate along their respective paths 115, 125, for example, due to differences in the characteristics of the ions and/or the ion beam. By way of example, the ions of the first group 15 and second group 25 may differ in polarity such that potentials applied to the inner trapping plates 104$a_1$, 104$b_1$ are ineffective to repel the ions of the other group 25 to reverse their direction at the turning point of the first group 15. Additionally or alternatively, it will be appreciated that second group 25 of ions may be injected with and be maintained with sufficient energy to overcome the barrier posed by inner trapping plates 104$a_1$, 104$b_1$, for example.

The ions of the first and second groups 15, 25 can be analyzed in various manners in accordance with the present teachings. By way of example, in some aspects, the ELIT 100 may provide for the simultaneous analysis of ions of the first and second groups 15, 25 oscillating along their respective path lengths $L_1$, $L_2$. In such cases, the charge induced on the central detector 102 can reflect the oscillation of both groups of ions, which can then be used to determine the various m/z of ions in both the first and second groups 15, 25. Moreover, as discussed above, another detector (e.g., one or more of the electrodes of the second group 104$b$/106$b$) can be utilized to particularly measure the charge induced by the oscillation of the second group 25 along the second path 125 in order to separate the analysis of the second ion group 25 (e.g., the first group 15 would not induce a charge on such a detector disposed outside of its path 115).

Rather than simultaneously analyze both groups of ions 15, 25 as discussed above, the present teachings also provide that the second group of ions 25 can be analyzed after the first group of ions 15. For example, after the oscillation of the ions of the first group 15 have been analyzed (e.g., after detector 102 measures an induced image charge or current produced by the ions 15 oscillating along path 115), the ions of the second group 25 can be injected. Notably, as discussed above, the potentials applied to the outer group 104*b*/106*b* can be ramped to their final values and achieve sufficient stabilization criterion following the injection and trapping of the first group of ions 15 within the inner group 104*a*/106*a*, but without waiting for the analysis of the first group of ions 15 to be completed. In some aspects, following the analysis of the first group of ions 15, the potentials applied to the inner group 104*a*/106*a* can then be adjusted, for example, prior to, during, or following the injection of the second group of ions 25 so as to remove the first group of ions 15 from the ELIT 100 prior to the analysis of the second group of ions 25. By way of example, the controller 102 can cause the potentials applied to the electrodes of the inner group 104*a*/106*a* to be adjusted to cause the first group of ions 15 to be ejected from the trap. Ejection of the first group ions 15 prior to, during, or following the injection of the second group of ions 25 can be achieved in a variety of manners. In some example aspects, the trapping potentials applied to the inner group's trapping plates $104a_1$, $104b_1$ can be lowered such that the first group of ions 15 leave the inner trap, become unstable, and are ejected. Alternatively, the potential of one or more electrodes of the inner group 104*a*/106*b* can be slightly adjusted to cause instability (e.g., about 100 V or less) such that the first group of ions 15 become unstable and are ejected. It will be appreciated that this change could be static or applied as a pulse train to cause the ejection. Alternatively, in some example aspects, the electrodes of the inner group 104*a*/106*a* can be grounded, for example, just prior to the injection of the second group 25, thereby causing ejection of the first group of ions 15. It will be appreciated that while power supply filters exhibit generally long time constants such that adjusting potentials between various non-zero voltages can require significant time for ramping and stabilization, the small changes to the potentials described above for causing instability and ejection of the first group of ions 15 (e.g., grounding of the electrodes of the inner group 104*a*/106*a*) can occur nearly instantaneously. In this manner, certain aspects of the present teachings beneficially provide for the analysis of the ions of the second group 25 nearly immediately (e.g., less than about 100 microseconds) after the analysis of the ions of the first group 15, thereby reducing the duty cycle of the ELIT 100 relative to conventional traps.

Figure 5:
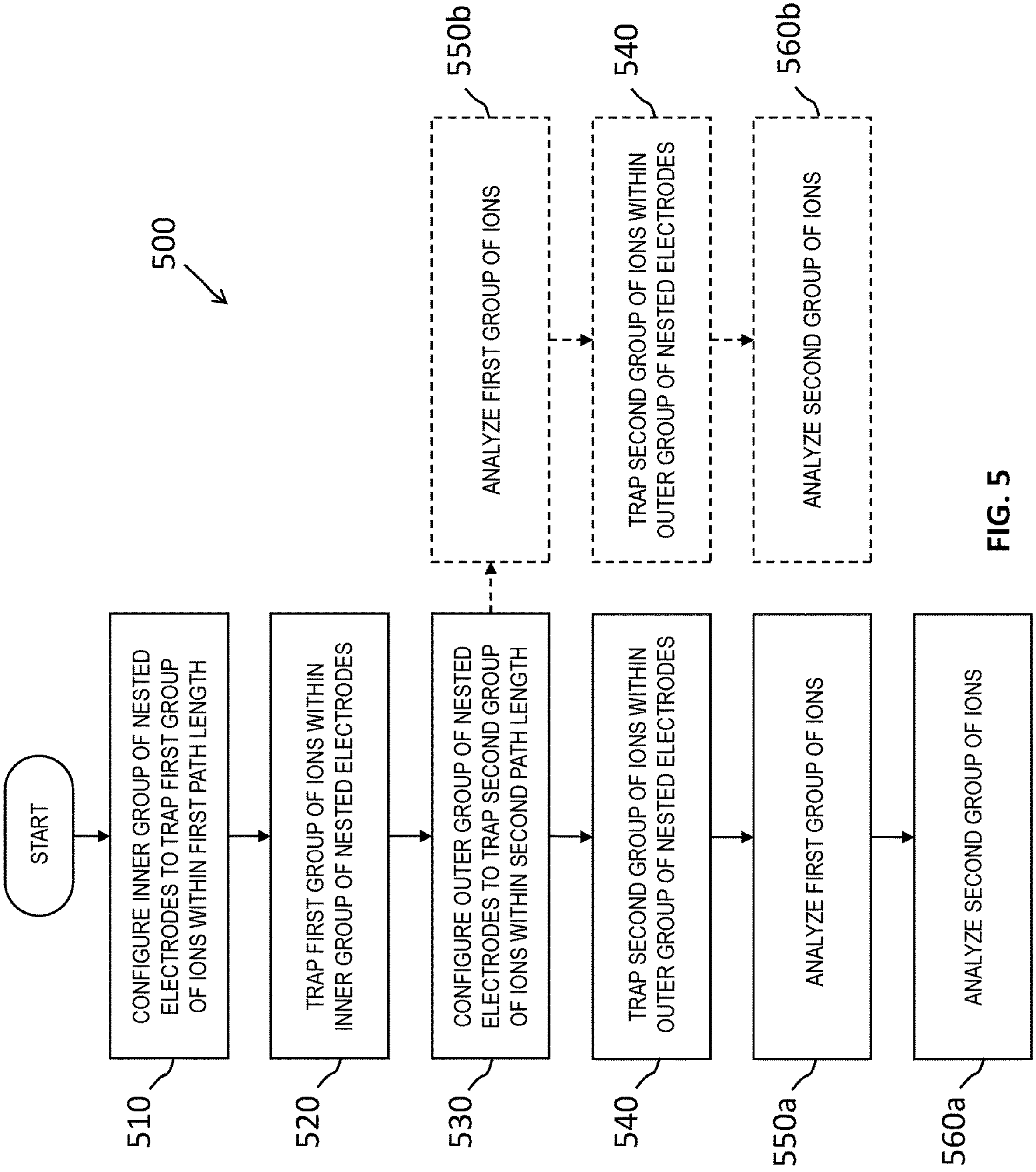
FIG. 5 is a flowchart showing an example method for operating the ELIT of FIG. 1 in accordance with an aspect of various embodiments of the applicant's teachings.

With reference now to FIG. 5, a flowchart showing exemplary methods 500 for operating an ELIT in accordance with various aspects of the present teachings is depicted. In step 510 of method 500, a nested ELIT can be configured to trap a first group of ions within the inner group of nested electrodes along a first path exhibiting a first path length. For example, a controller can cause one or more power supplies to apply trapping potentials to the inner group of nested electrodes. Thereafter, in step 520, the first group of ions can be injected into the ELIT and trapped within the inner group of nested electrodes such that the first group of ions oscillate along the first path length. For example, a controller can cause an upstream ion processing element to release or transmit the first group of ions for injection into the ELIT. Alternatively, the potential on an ion inlet of the ELIT can be adjusted so as to allow for the entry of the first group of ions.

Following injection and trapping of the first group of ions, the potentials applied to the outer group of nested electrodes can be adjusted in step 530 so as to configure the ELIT to trap a second group of ions therein. For example, a controller can cause one or more power supplies to apply trapping potentials to the outer group of nested electrodes. In step 540, the second group of ions can then be injected into the ELIT and trapped within the outer group of nested electrodes such that the second group of ions oscillate along a second path exhibiting a second path length. For example, a controller can cause an upstream ion processing element to release or transmit the second group of ions for injection into the ELIT. Alternatively, the potential on an ion inlet of the ELIT can be adjusted so as to allow for the entry of the second group of ions.

As discussed otherwise herein, the frequency of oscillation of each of the groups of ions along their respective path lengths can be detected and analyzed to determine the mass spectrum for each group. In some example aspects, the detection and analysis of the first group of ions in step 550*a* can occur after the potentials are applied to the outer group of nested electrodes in step 530 and after the second group of ions have been trapped therein in step 540. The detection and analysis of the second group of ions can then occur in step 560*a*. In some alternative aspects, the detection and analysis of the first group of ions can occur in step 550*b* after the potentials are applied to the outer group of nested electrodes in step 530, but before the second group of ions have been injected in step 540. The detection and analysis of the second group of ions can then occur in step 560*b*.

Figure 6:
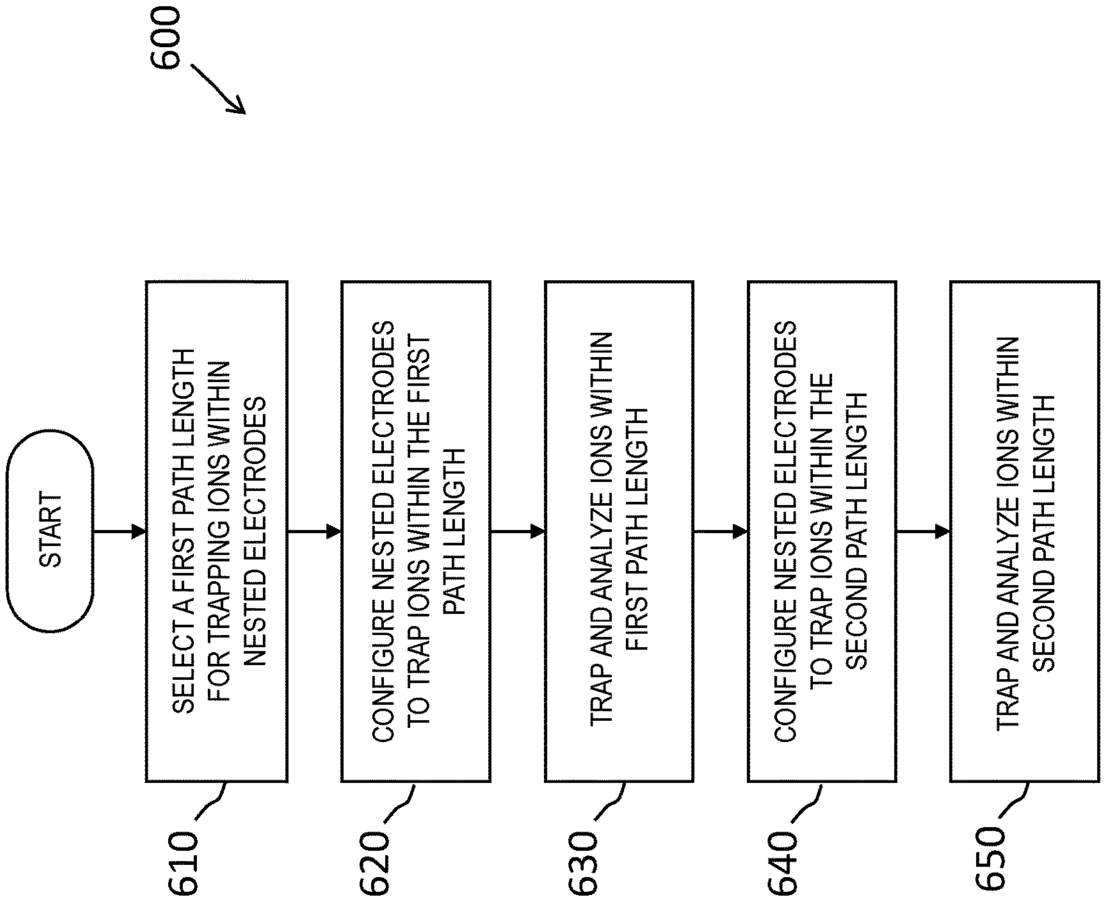
FIG. 6 is a flowchart showing another example method for operating the ELIT of FIG. 1 in accordance with an aspect of various embodiments of the applicant's teachings.

With reference now to FIG. 6, a flowchart showing exemplary methods 600 for operating an ELIT in accordance with various aspects of the present teachings is depicted. In step 610, a controller can initially select a first path length (e.g., $L_1$ of FIG. 2 or $L_2$ of FIG. 3) to analyze the next group of ions and configure the ELIT accordingly in step 620. For example, a controller can cause one or more power supplies to apply trapping potentials to either the inner group or outer group of nested electrodes. In step 630, the ions to be analyzed can be injected and trapped, with the detected frequency of oscillation being used to determine the mass spectra of injected ions. Following the analysis in step 630, the controller can determine if the subsequent analysis is to utilize the same or different path length. If no changes to the path length are required, the next group of ions can be injected directly after the analysis of the first group analyzed without adjusting the potentials applied to the nested electrodes defining the first path length. However, if the controller determines that a second, different path length is to be used to analyze the next sample, the controller can cause the one or more power supplies to apply trapping potentials to a different group of nested electrodes as in step 640. The ions can then be injected and trapped within the second path length as in step 650, with the detected frequency of oscillation being used to determine the mass spectra of this group of ions.

Figure 7:
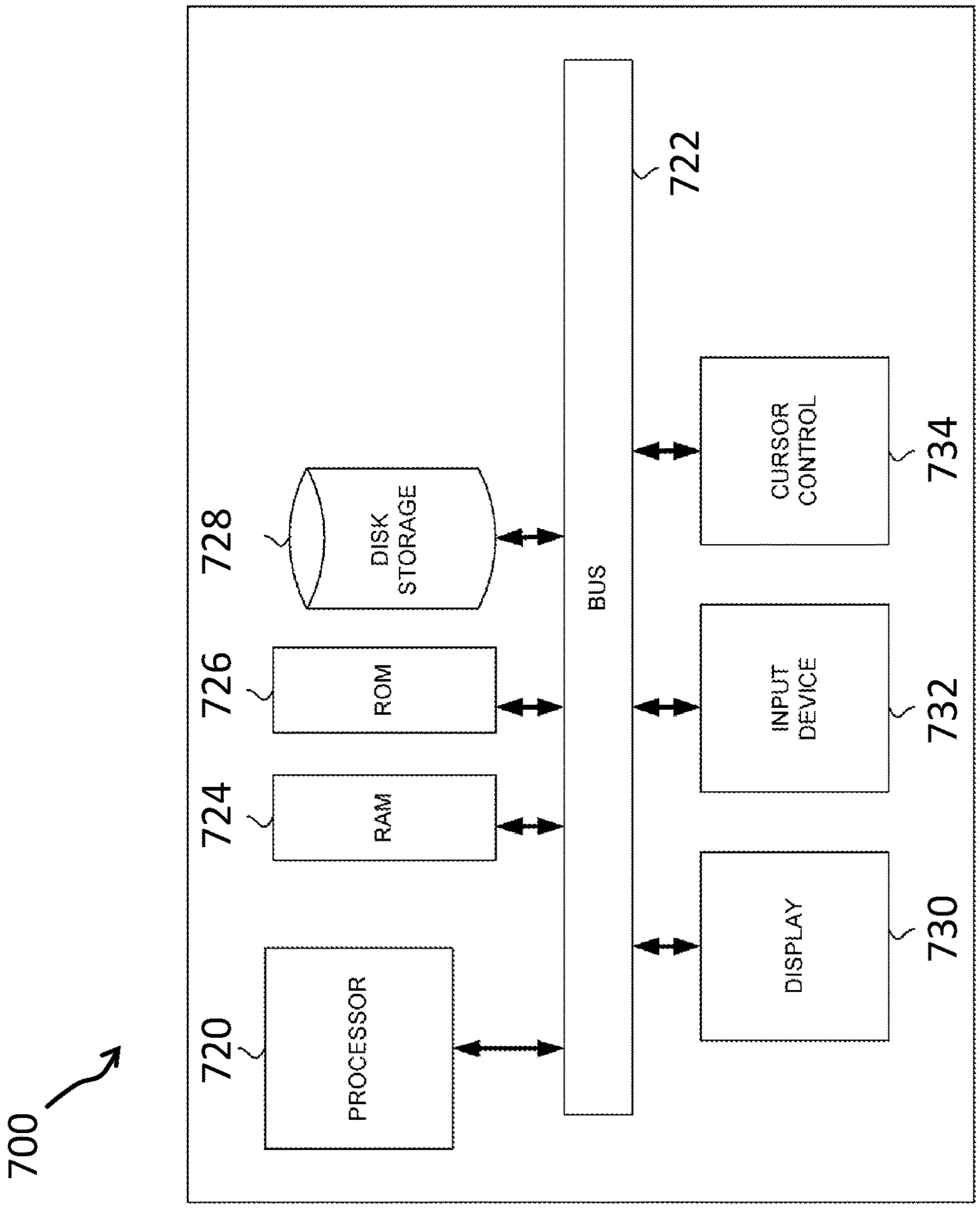
FIG. 7 is a block diagram that illustrates a computer system, upon which embodiments of the present teachings may be implemented in accordance with various aspects of the applicant's teachings.

FIG. 7 is a block diagram that illustrates a computer system 700, upon which embodiments of the present teachings may be implemented. Computer system 700 includes a bus 722 or other communication mechanism for communicating information, and a processor 720 coupled with bus 722 for processing information. Computer system 700 also includes a memory 724, which can be a random access memory (RAM) or other dynamic storage device, coupled to bus 722 for storing instructions to be executed by processor 720. Memory 724 also may be used for storing temporary variables or other intermediate information during execution of instructions to be executed by processor 720. Computer system 700 further includes a read only memory (ROM) 726 or other static storage device coupled to bus 722 for storing static information and instructions for processor 720. A storage device 728, such as a magnetic disk or optical disk, is provided and coupled to bus 722 for storing information and instructions.

Computer system 700 may be coupled via bus 722 to a display 730, such as a cathode ray tube (CRT) or liquid crystal display (LCD), for displaying information to a computer user. An input device 732, including alphanumeric and other keys, is coupled to bus 722 for communicating information and command selections to processor 720. Another type of user input device is cursor control 734, such as a mouse, a trackball or cursor direction keys for communicating direction information and command selections to processor 720 and for controlling cursor movement on display 730. This input device typically has two degrees of freedom in two axes, a first axis (i.e., x) and a second axis (i.e., y), that allows the device to specify positions in a plane.

A computer system 700 can perform the present teachings. Consistent with certain implementations of the present teachings, results are provided by computer system 700 in response to processor 720 executing one or more sequences of one or more instructions contained in memory 724. Such instructions may be read into memory 724 from another computer-readable medium, such as storage device 728. Execution of the sequences of instructions contained in memory 724 causes processor 720 to perform the process described herein. Alternatively, hard-wired circuitry may be used in place of or in combination with software instructions to implement the present teachings. Thus, implementations of the present teachings are not limited to any specific combination of hardware circuitry and software. For example, the present teachings may be performed by a system that includes one or more distinct software modules for perform a method for operating an ELIT in accordance with various embodiments (e.g., a control module, an injection module, a FT module).

In various embodiments, computer system 700 can be connected to one or more other computer systems, like computer system 700, across a network to form a networked system. The network can include a private network or a public network such as the Internet. In the networked system, one or more computer systems can store and serve the data to other computer systems. The one or more computer systems that store and serve the data can be referred to as servers or the cloud, in a cloud computing scenario. The one or more computer systems can include one or more web servers, for example. The other computer systems that send and receive data to and from the servers or the cloud can be referred to as client or cloud devices, for example.

The term "computer-readable medium" as used herein refers to any media that participates in providing instructions to processor 720 for execution. Such a medium may take many forms, including but not limited to, non-volatile media, volatile media, and transmission media. Non-volatile media includes, for example, optical or magnetic disks, such as storage device 728. Volatile media includes dynamic memory, such as memory 724. Transmission media includes coaxial cables, copper wire, and fiber optics, including the wires that comprise bus 722.

Common forms of computer-readable media or computer program products include, for example, a floppy disk, a flexible disk, hard disk, magnetic tape, or any other magnetic medium, a CD-ROM, digital video disc (DVD), a Blu-ray Disc, any other optical medium, a thumb drive, a memory card, a RAM, PROM, and EPROM, a FLASH-EPROM, any other memory chip or cartridge, or any other tangible medium from which a computer can read.

Various forms of computer readable media may be involved in carrying one or more sequences of one or more instructions to processor 720 for execution. For example, the instructions may initially be carried on the magnetic disk of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector coupled to bus 722 can receive the data carried in the infra-red signal and place the data on bus 722. Bus 722 carries the data to memory 724, from which processor 720 retrieves and executes the instructions. The instructions received by memory 724 may optionally be stored on storage device 728 either before or after execution by processor 720.

The descriptions herein of various implementations of the present teachings have been presented for purposes of illustration and description. It is not exhaustive and does not limit the present teachings to the precise form disclosed. Modifications and variations are possible in light of the above teachings or may be acquired from practicing of the present teachings. Additionally, the described implementation includes software, though the present teachings may be implemented as a combination of hardware and software or in hardware alone. The present teachings may be implemented with both object-oriented and non-object-oriented programming systems.

The section headings used herein are for organizational purposes only and are not to be construed as limiting. While the applicant's teachings are described in conjunction with various embodiments, it is not intended that the applicant's teachings be limited to such embodiments. On the contrary, the applicant's teachings encompass various alternatives, modifications, and equivalents, as will be appreciated by those of skill in the art.

What is claimed is:

1. An electrostatic linear ion trap (ELIT), comprising:

a first set of electrode plates having holes in the center and aligned along a central axis;

a second set of electrode plates having holes in the center and aligned along the central axis;

one or more voltage sources; and a controller, operably coupled to the one or more voltage sources, configured to:

apply voltages from the one or more voltage sources to a first group of plates of the first and second sets of electrode plates to cause the first group of plates to trap a first group of ions within a first path length along the central axis; and simultaneously apply voltages from the one or more voltage sources to a second group of plates of the first and second sets of electrode plates to cause the second group of plates to trap a second group of ions within a second path length along the central axis, wherein the second path length is longer than the first path length.

2. The ELIT of claim 1, wherein the controller is further configured to cause the second group of plates to trap the second group of ions within the second path length while the first group of ions are trapped within the first path length or wherein the controller is further configured to control the injection of the first and second groups of ions into the first and second sets of electrode plates.

3. The ELIT of claim 1, wherein the controller is operably coupled to an upstream ion trap from which the first and second groups of ions are injected into the first and second sets of electrode plates.

4. The ELIT of claim 1, further comprising at least one detector disposed between the first set of electrode plates and the second set of electrode plates.

5. The ELIT of claim 4, wherein the at least one detector is configured to measure the electric current induced by the first group of ions oscillating along the first path length and the electric current induced by the second group of ions oscillating along the second path length.

6. The ELIT of claim 4, wherein the at least one detector comprises a first detector configured to measure the electric current induced by the first group of ions oscillating along the first path length and a second detector configured to measure the electric current induced by the second group of ions oscillating along the second path length.

7. The ELIT of claim 1, wherein the first group of ions and the second group of ions differ in at least one of polarity and injection energy.

8. The ELIT of claim 1, wherein the first group of plates and the second group of plates do not share any plates.

9. The ELIT of claim 1, wherein each of the first group of plates and the second group of plates includes at least one trapping plate, at least one plate to change the curvature of the electric field near a turning point, and at least one plate to radially confine ions.

10. The ELIT of claim 1, wherein the first group of plates includes at least four plates from the first set and at least four plates from second set and wherein the second group of plates includes at least four plates from the first set and at least four plates from second set.

11. The ELIT of claim 1, further comprising one or more switches, wherein the controller is further operably connected to the one or more switches so as to:

select the first path length by applying voltages from the one or more voltage sources to the first set and the second set that cause the first group of plates to trap a third group of ions within the first path length; and select the second path length by applying voltages from the one or more voltage sources to the first set and the second set that cause the second group of plates to trap the third group of ions within the second path length.

12. The ELIT of claim 1, wherein a third group of plates of the first set and the second set are positioned along the central axis to trap ions within a third path length of the central axis that is longer than the second path length.

13. A method of operating an electrostatic ion trap (ELIT), comprising:

applying voltages from one or more voltage sources to a first group of plates of a first set of electrode plates and a second set of electrode plates, wherein each electrode plate of the first and second sets of electrode plates have a hole in the center aligned along a central axis, wherein the application of voltages causes a first group of ions to be trapped within a first path length along the central axis defined by the first group of plates; and simultaneously applying voltages from the one or more voltage sources to a second group of plates of the first and second sets of electrode plates to cause the second group of plates to be configured to trap a second group of ions within a second path length along the central axis, wherein the second path length is longer than the first path length.

14. The method of claim 13, wherein at least one detector is disposed between the first and second sets of electrode plates, the method further comprising measuring with at least one detector the electric current induced by the first group of ions oscillating along the first path length and the electric current induced by the second group of ions oscillating along the second path length.

15. The method of claim 13, further comprising:

measuring with a first detector the electric current induced by the first group of ions oscillating along the first path length; and measuring with a second detector the electric current induced by the second group of ions oscillating along the second path length.

16. The method of claim 13, further comprising trapping the second group of ions within the second path length while the first group of ions are trapped within the first path length.

17. The method of claim 16, further comprising detecting a frequency of oscillation of the first group of ions after trapping the second group of ions within the second path length.

18. The method of claim 13, further comprising detecting a frequency of oscillation of the first group of ions prior to trapping the second group of ions within the second path length.

19. The method of claim 13, wherein the first group of ions and the second group of ions differ in at least one of polarity and injection energy.

20. A computer program product, comprising a non-transitory and tangible computer-readable storage medium whose contents include a program with instructions being executed on a processor to perform the method of claim 13.

* * * * *